May 7, 1968  R. E. HUPP ETAL  3,381,654
AUTOMATICALLY OPERATING BOOKMARK
Filed May 12, 1967  2 Sheets-Sheet 1

INVENTORS
ROSS E. HUPP
WILLIAM R. GALLAGHER

BY
ATTORNEY

May 7, 1968   R. E. HUPP ET AL   3,381,654
AUTOMATICALLY OPERATING BOOKMARK
Filed May 12, 1967   2 Sheets-Sheet 2
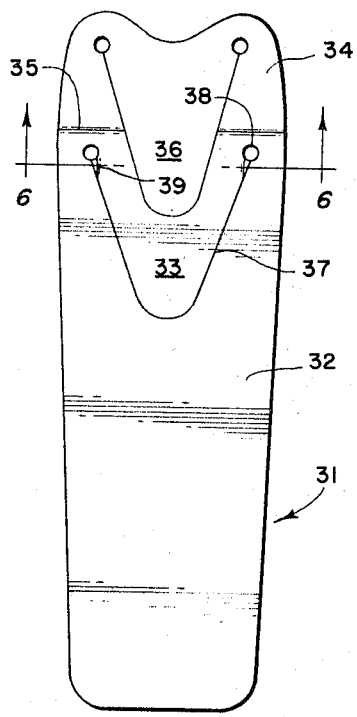
FIG. 5
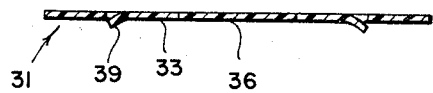
FIG. 6
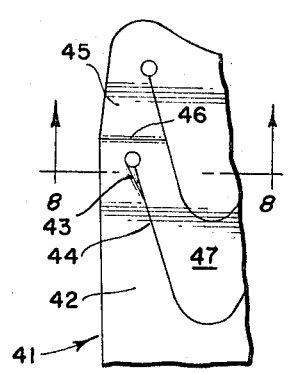
FIG. 7
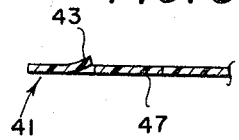
FIG. 8
FIG. 5a
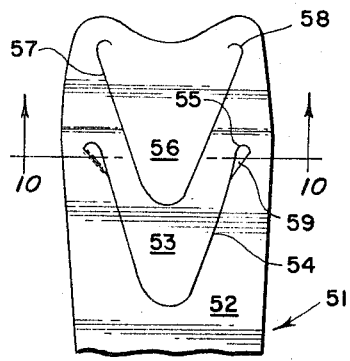
FIG. 9
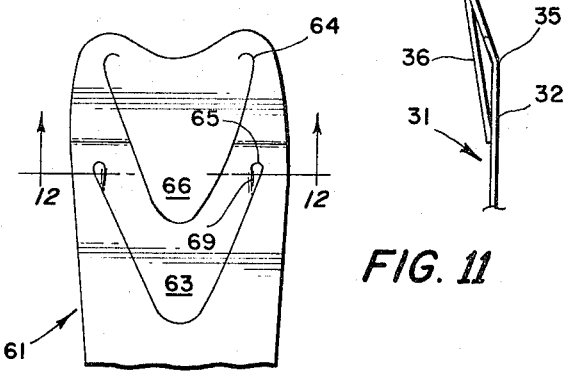
FIG. 11
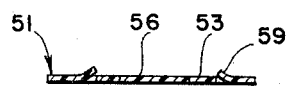
FIG. 10
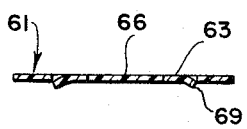
FIG. 12
INVENTORS
ROSS E. HUPP
WILLIAM R. GALLAGHER
BY
ATTORNEY

United States Patent Office 3,381,654
Patented May 7, 1968

3,381,654
AUTOMATICALLY OPERATING BOOKMARK
Ross E. Hupp, 4961 La Gama Way, Santa Barbara, Calif. 93105, and William R. Gallagher, 1550 Hillside Drive, Glendale, Calif. 91208
Continuation-in-part of abandoned application Ser. No. 560,218, June 24, 1966. This application May 12, 1967, Ser. No. 648,514
6 Claims. (Cl. 116—119)

ABSTRACT OF THE DISCLOSURE

A one-piece bookmark made of a plane strip of flexible, resilient material has a clip portion spaced from one end with a holding tongue in the plane of the strip to clip the bookmark to pages of a book and an indicator portion with a page indicating marking tongue at the end of the strip with the free end of the page indicating tongue extending over the clip portion so that the end of the page indicating tongue will overlie pages of the book. The edge of the page indicating tongue is inclined so that turning a page will automatically cam the tongue out of the path of the page, the tongue returning to its original position to indicate the next page.

The tongues are formed from the plane of the strip by slitting the strip with the ends of the slits curved to distribute the stress of flexing and bending the tongues and to provide space for pages held by the holding tongue. The material adjacent the end of the slit in the clip portion is deflected from the plane of the strip to provide greater gripping effect of the clip portion. The clip portion and indicator portion may be joined along a bend or crease in the strip to form an angle between the portions so the page indicating tongue may overlie more pages.

Copending application

This application is a continuation-in-part of Ser. No. 560,218, filed June 24, 1966, for Automatically Operating Bookmark, now abandoned.

Summary of invention

The principal object of this invention is a bookmark formed from flat material which may be clipped to a number of pages with a marking or page indicating tongue having its free end overlying pages of the book and formed to be moved out of the path of a page as it is turned and to return to its position to indicate the next page.

A clip portion spaced from the end has a holding tongue formed by slitting the strip so pages of a book may be held by the tongue and body of the strip. The end forms an indicator portion having a page indicating or marking tongue so connected that its free end extends over the clip portion and the connection of the holding tongue. The edge of the indicating tongue is inclined to be engaged by a page as the page is turned and to be cammed out of its path, the resilience of the tongue restoring it to its position over the margin of the next page.

The ends of the slits terminate in curved cuts to distribute the stresses, either by curved ends of the slits or by apertures adjoining the ends of the slits. These curved cuts also provide space for the pages of the book which the clip portion engages. The material adjacent the ends of the slits in the clip portion may be deflected out of the plane of the strip to increase the holding effect of the clip portion. A transverse bend or crease at the juncture of the clip portion and the indicator portion of the strip forms an angle between the indicator and clip portions and enables the end of the indicating or marking tongue to overlie a greater number of pages.

Further objects and advantages will be apparent from the following description and drawings of specific embodiments of the invention.

The drawings

Figure 1:
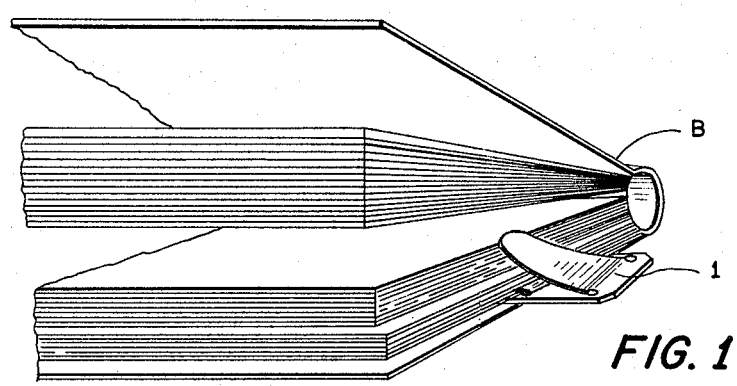
Figures 2, 3, 4:
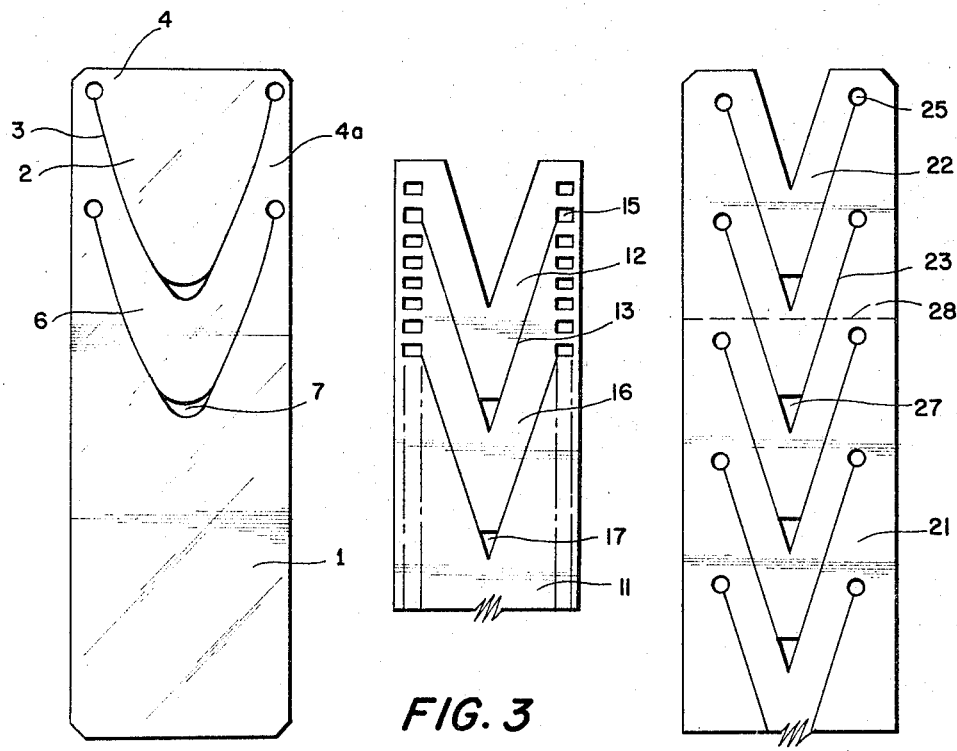

FIGURE 1 shows a book B with the mark in position of use.
FIGURE 2 shows a plan view of the bookmark.
FIGURE 3 shows one modified form of mark.
FIGURE 4 shows a second modified form.
FIGURE 5 shows a plan view of a modified form of bookmark.
FIGURE 5a is a side elevation of the bookmark of FIGURE 5.
FIGURE 6 is a cross section on line 6—6 of FIGURE 5.
FIGURE 7 is a fragmentary plan view of a further modification.
FIGURE 8 is a cross section on line 8—8 of FIGURE 7.
FIGURE 9 shows a plan view of a further modification.
FIGURE 10 is a cross section on line 10—10 of FIGURE 9.
FIGURE 11 shows a plan view of a further modification.
FIGURE 12 is a cross section on line 12—12 of FIGURE 11.

Description of invention

The bookmark 1 is in the form of a plane element or strip of flexible material, such as a plastic sheet. At one end, a marking or indicator portion has a tapered page indicating tongue 2 formed by slitting the strip at 3, leaving an integral connection 4 to the strip at the base of the tongue to form a flexible, resilient hinge portion. An aperture 5 at the base end of each slit increases the flexibility and distributes the stress caused by bending or pulling the tongue, so that rupture of the material is avoided. The apertures may take various forms, such as added transverse slits.

A clip portion integral with the indicator portion and spaced from the end of the strip has a second tongue 6 similarly formed in the strip with its hinge portions 4a intermediate the sides of the first tongue 2, so that page indicating tongue 2 extends a substantial distance into the area of the clip portion and tongue 6, as shown in FIGURE 2. The hinge portions 4a between the apertures 5 of tongue 6 and the slit 3 of tongue 2 provide a very flexible hinge for the tongue 6.

The body of the strip 1 at the tip of each tongue is cut out as at 7 to leave a space between the tip of the tongue and the body of the strip, so that the tongue is free to be flexed out of the plane of the strip.

In use, the strip 1 is inserted in the book B in back of the position of the pages in use, the clip portion with the tongue 6 engaging several pages to hold the bookmark in the book. Then, as shown in FIGURE 1, the tapered tip end of page indicating or marking tongue 2 will lie in front of the margin of the page to which the book B is open. As each page is turned, it engages the inclined edge of the page indicating tongue 2, which resiliently hinges about the connection at 4, and resumes its position in front of the next page, the body of the strip and the holding tongue 6 maintaining the position of the bookmark in the book with the end of marking or indicating tongue 2 overlying the pages of the book.

The strip 1 may be of any flexible material, such as sheet plastic which has been found to be durable and attractive. This material may be transparent or translucent, and may have printing or advertising on its face. In the flat form, the bookmarks may be stacked easily and are inexpensive to manufacture and distribute. Additional indicia may be incorporated, as for use as a ruler, calendar, etc.

An especially inexpensive and convenient material is old motion picture film after removal of the emulsion. As shown in FIGURE 3, the strip 11 is formed with a plurality of tongues 12 and 16 by convergent slits 13 from the sprocket holes 15 to the tips of the tongues. The sharp tip is cut off to leave a space 17, similar to the space in FIGURE 2.

This element 11 may be provided with several tongues along its length, the tongues overlapping as do tongues 12 and 16. If the end tongue in use becomes torn or separated, the next tongue may then be used for the marking or indicating tongue, and the next adjacent tongue will serve to hold the strip in the book. The sprocket holes 15 at the ends of the slits serve to relieve stress in the hinge portion the same as the holes 5 in FIGURE 2.

An example of formation of a strip element of indefinite length which may be cut to form bookmarks according to this invention is shown in FIGURE 4. This element 21 is slit at 23 to form successive tongue 22. The slits 23 end in stress-relieving apertures 25 and the tips of the tongues are cut off to leave spaces 27. If the upper tongues become torn or ruptured, the strip may be cut off as at dotted line 28, leaving the next successive tongues to act as the bookmark. In the same manner, the strip 21 may be made of indefinite length, and separated into individual bookmarks for use.

The bookmarks 31 shown in FIGURES 5 and 6 has incorporated certain improved features. The strip 31 has a clip portion 32 with a holding tongue 33 and an indicator marking portion 34, a bend or crease 35 forming an angle between the juncture of the two portions. This bend enables the indicating tongue 36 to overlie more pages than in the form in FIGURE 2.

In the clip portion 32, the tongue 33 has the edges of the ends of slit 37 connected to apertures 38 deflected out of the plane of the strip at 39. These edges are deflected in a direction to engage the pages of a book held between the body of strip 31 and tongue 33. These edges increase the gripping effect of the clip portion and maintain the clip portion in position without the likelihood of falling out of place.

In FIGURES 7 and 8, the edges 43 of the body of the clip portion 42 at the ends of slit 44 are deflected out of the plane of strip 41, to engage pages held between the tongue 47 and strip 41. The indicator or marking portion 45 may be bent at an angle to clip portion 42 about the line 46.

In FIGURES 9 and 10, the strip 51 is bent at an angle to form a juncture between clip portion 52 with the holding tongue 53 and the indicator portion with page indicating tongue 56. The holding tongue 53 and indicating tongue 56 are formed by slits 54 and 57 ending in semicircular curved cuts 55 and 58, respectively, without removal of any material of the strip. These curved cuts at the ends of the slits reduce the stress concentration of any pulling or bending of the tongues, and in the clip portion also provide space for the pages of the book. In this form, no material is removed which might interfere with the die cutting process.

The semicircular cuts 55 in the clip portion 52 extend into the body of the clip to encompass the portions 59 of the body of the strip. These portions 59 are deflected out of the plane of the strip to provide an effective grip on the pages of a book engaged by the clip portion.

The tongues 63 and 66 of the bookmark 61 in FIGURES 11 and 12, which is similar to that in FIGURE 9, are also formed by slits ending in semicircular cuts 64, 65, but the cuts 65 in the clip portion extend into the tongue 63 to encompass portions 69, which are deflected out of the plane of the strip to grip the pages of a book.

In all of the bookmarks shown, the clip portion holds the bookmark on pages of a book and limits its insertion, so that only the tip of the page indicating tongue will overlie the pages being turned. As each page is turned, the inclined edge of the indicating tongue cams the tongue out of the path of the pages, and the resilience of the tongue restores it to its position to indicate the succeeding page.

The curved cuts at the ends of the slits, whether forming a complete aperture of 360° or a semicircle of 180°, reduce stress concentration and provide space in the clip portion for pages of a book. The deflected edges along the slits assure retention of the bookmark in place, and the transverse bend enables greater spacing of the marking portion and indicating tongue. Any suitable material which flexes and has sufficient resilience to resume its original position may be used, including certain types of paper, especially if properly treated, and various resinous plastics.

The invention may be embodied in various modifications without departing from the spirit and scope of the invention claimed.

What is claimed is:

1. An automatically operating bookmark formed from a substantially plane strip of flexible, resilient material which returns to its original shape after being flexed in use, said bookmark comprising a clip portion having a holding tongue in the plane of said clip portion connected to the body of said strip by integral, flexible hinge connections spaced from one end of said strip, said holding tongue extending toward the opposite end of said strip and being formed from the material of said strip by slitting said strip along the sides of said tongue between said integral connections and the end of said tongue, one edge of each end of the slit adjacent an integral hinge connection being deflected out of the plane of the strip in a direction to engage the pages to secure the clip portion on the book, and an indicator portion adjacent said one end having a page indicating tongue integrally, flexibly connected to the body of said strip spaced from said clip portion adjacent said one end and formed from the material of said strip by slitting said strip from adjacent said end of strip and extending past the integral hinge connections of said holding tongue so that the tip of said indicating tongue overlaps said clip portion and holding tongue and pages of a book on which said clip portion is engaged, the tip of said indicating tongue having an edge inclined to the longitudinal direction of said strip so that underlying pages will cam said indicating tongue out of their path as said pages are turned.

2. A bookmark as claimed in claim 1, in which the slits forming the tongues terminate in apertures at said integral portions to increase flexibility and to relieve the concentration of stress and to receive edges of pages on which the clip portion is engaged.

3. A bookmark as claimed in claim 1, in which the integral connection between the indicator portion and clip portion is defined by a bend across the strip, to provide an angle between the clip portion and the indicator portion so said indicating tongue may be spaced from said clip portion when the clip portion is held in a book.

4. An automatically operating bookmark formed from a substantially plane strip of flexible, resilient material which returns to its original shape after being flexed in use, said bookmark comprising a clip portion having a holding tongue in the plane of said clip portion connected to the body of said strip by integral, flexible hinge connections spaced from one end of said strip, said holding tongue extending toward the opposite end of said strip and being formed from the material of said strip by slitting said strip along the sides of said tongue between said integral connections and the end of said tongue, each end of the slit adjacent an integral hinge connection terminating in a curved cut of at least 180° to avoid stress concentration and to provide space for pages of a book to which said clip portion is applied, material of said strip adjacent each of said curved cuts being deflected out of the plane of said clip portion in a direction to engage said pages and increase the hold of said clip portion on said pages, and an indicator portion adjacent said one end having a page indicating tongue integrally, flexibly connected to the body of said strip spaced from said clip portion adjacent said one end and formed from the material of said strip by slitting said strip from adjacent said end of said strip and extending past the integral hinge connections of said holding tongue to overlap said clip portion and holding tongue and pages of a book on which said clip portion is engaged, said indicating tongue having an edge inclined to the longitudinal direction of said strip so that underlying pages will cam said indicating tongue out of their path as said pages are turned.

5. A bookmark as claimed in claim 4, in which the indicator portion is connected to the clip portion at an angle along a bend across the strip, to provide greater spacing of the indicating tongue and the holding tongue when the clip portion is held in a book.

6. An automatically operating bookmark formed from a substantially plane strip of flexible, resilient material which returns to its original shape after being flexed in use, said book mark comprising a clip portion having a holding tongue in the plane of said clip portion connected to the body of said strip by integral, flexible hinge connections spaced from one end of said strip, said holding tongue extending toward the opposite end of said strip and being formed from the material of said strip by slitting said strip along the sides of said tongue between said integral connections and the end of said tongue, each end of the slit adjacent an integral hinge connection terminating in an approximately semicircular cut to avoid stress concentration and to provide space for pages of a book to which said clip portion is applied without removal of material by said cut, the material encompassed by said semicircular cut being deflected out of the plane of said clip portion in a direction to engage said pages and increase the hold of said clip portion on said pages, and an indicator portion adjacent said one end having a page indicating tongue integrally, flexibly connected to the body of said strip spaced from said clip portion adjacent said one end and formed from the material of said strip by slitting said strip from adjacent said end of said strip in a semicircular cut and extending linearly past the integral hinge connections of said holding tongue to overlap said clip portion and holding tongue and pages of a book on which said clip portion is engaged, said marking tongue having an edge inclined to the longitudinal direction of said strip so that underlying pages will cam said marking tongue out of their path as said pages are turned.

References Cited

UNITED STATES PATENTS

| | | | |
|---|---|---|---|
| 793,826 | 7/1905 | Damico | 116—119 |
| 1,415,631 | 5/1922 | Grimm | 116—119 |
| 1,977,931 | 10/1934 | Woodley | 116—119 |
| 2,116,147 | 5/1938 | Haessler | 116—119 |
| 2,449,211 | 9/1948 | Forsyth | 116—119 |
| 2,609,629 | 9/1952 | Hubbard | 116—119 |
| 2,717,572 | 9/1955 | Kingman | 116—119 |
| 3,095,624 | 7/1963 | Croisant | 24—66 |

FOREIGN PATENTS 25,090   1904   Great Britain.

LOUIS J. CAPOZI, *Primary Examiner.*